(12) United States Patent
Venkataswami et al.

(10) Patent No.: US 10,148,517 B2
(45) Date of Patent: Dec. 4, 2018

(54) SYSTEMS AND METHODS FOR TOPOLOGY DISCOVERY AND APPLICATION IN A BORDER GATEWAY PROTOCOL BASED DATA CENTER

(71) Applicant: Dell Products, L.P., Round Rock, TX (US)

(72) Inventors: Balaji Venkat Venkataswami, Chennai (IN); Bhargav Bhikkaji, San Jose, CA (US); Narayana Swamy Perumal, Chennai (IN)

(73) Assignee: Dell Products L.P., Round Rock, TX (US)

(*) Notice: Subject to any disclaimer, the term of this patent is extended or adjusted under 35 U.S.C. 154(b) by 189 days.

(21) Appl. No.: 14/981,809

(22) Filed: Dec. 28, 2015

(65) Prior Publication Data

US 2016/0191329 A1    Jun. 30, 2016

Related U.S. Application Data

(62) Division of application No. 13/723,151, filed on Dec. 20, 2012, now Pat. No. 9,225,624.

(51) Int. Cl.
*G06F 15/173* (2006.01)
*H04L 12/24* (2006.01)
(Continued)

(52) U.S. Cl.
CPC .......... *H04L 41/12* (2013.01); *H04L 41/0677* (2013.01); *H04L 41/22* (2013.01);
(Continued)

(58) Field of Classification Search
USPC ....................................................... 709/224
See application file for complete search history.

(56) References Cited

U.S. PATENT DOCUMENTS 5,856,927 A * 1/1999 Greidinger .......... G06F 17/5077
                                                       257/206
6,938,095 B2 * 8/2005 Basturk .................. G06F 9/542
                                                       370/351
(Continued)

OTHER PUBLICATIONS

Parantap Lahiri et al., Routing Design for Large Scale Data Centers: BGP is a better IGP, (Global Networking Services Team, Global Foundation Services, Microsoft): <URL: https://www.nanog.org/meetings/nanog55/presentations/Monday/Lapukhov.pdf>, Published in 2012, 28 pages.

*Primary Examiner* — Alan S Chou
(74) *Attorney, Agent, or Firm* — Haynes and Boone, LLP

(57) ABSTRACT

An information handling system is provided. The information handling system includes a network orchestration service running on a computer processor. The network orchestration service provides a Border Gateway Protocol (BGP) listener module and a topology builder module. The BGP listener module is configured to receive information from a plurality of spine devices configured as an autonomous system and the topology builder module is configured to use the information received by the BGP listener module to create a topology of a data center that includes the plurality of spine devices. Additionally, the network orchestration service is in communication with a memory that is used to store information received by the BGP listener module and the topology of the data center. Applications of the information handling system for better operating the data center are also provided.

20 Claims, 9 Drawing Sheets

(51) Int. Cl.
  H04L 12/26 (2006.01)
  H04L 12/751 (2013.01)
  H04L 12/715 (2013.01)
  H04L 12/741 (2013.01)
  H04L 12/713 (2013.01)
  H04L 12/721 (2013.01)
  H04L 12/931 (2013.01)
  H04L 12/18 (2006.01)
  H04L 12/745 (2013.01)
  H04L 12/46 (2006.01)
  H04L 29/12 (2006.01)
  H04L 12/947 (2013.01)

(52) U.S. Cl.
  CPC .............. H04L 43/10 (2013.01); H04L 45/02 (2013.01); H04L 45/04 (2013.01); H04L 12/18 (2013.01); H04L 12/1886 (2013.01); H04L 12/462 (2013.01); H04L 43/0882 (2013.01); H04L 43/16 (2013.01); H04L 45/586 (2013.01); H04L 45/72 (2013.01); H04L 45/74 (2013.01); H04L 45/745 (2013.01); H04L 45/748 (2013.01); H04L 49/25 (2013.01); H04L 49/70 (2013.01); H04L 61/103 (2013.01)

(56) References Cited

U.S. PATENT DOCUMENTS 7,130,920 B1 * 10/2006 Sailor .................... H04L 67/32
  370/218
7,606,887 B1 * 10/2009 Stewart .............. H04L 41/5003
  709/223
2002/0165981 A1 * 11/2002 Basturk ............... H04L 12/5602
  709/242
2002/0184393 A1 * 12/2002 Leddy .................. H04L 49/358
  709/249
2004/0037275 A1 * 2/2004 Li ........................... H04L 45/00
  370/370
2005/0108386 A1 * 5/2005 Acharya ............. H04L 12/2856
  709/224
2007/0064702 A1 * 3/2007 Bates ...................... H04L 45/02
  370/392
2007/0140251 A1 * 6/2007 Dong .................. H04L 12/4645
  370/392
2007/0165543 A1 * 7/2007 Joo ......................... H04L 45/02
  370/254
2007/0217415 A1 * 9/2007 Wijnands ............ H04L 12/1836
  370/390
2008/0016311 A1 * 1/2008 Harada .................. G06F 3/0605
  711/170
2008/0049717 A1 * 2/2008 Jamieson ............ H04L 12/2856
  370/351
2008/0247361 A1 * 10/2008 Jung ..................... H04W 36/12
  370/331
2009/0010168 A1 * 1/2009 Yurchenko ............. H04L 12/66
  370/237
2010/0202466 A1 * 8/2010 Eswaran ................ H04L 45/02
  370/400
2011/0268118 A1 * 11/2011 Schlansker ......... H04L 12/4641
  370/392
2013/0346587 A1 * 12/2013 Barkett .................. G06Q 50/01
  709/224
2014/0101336 A1 * 4/2014 Yang ...................... H04L 45/02
  709/244
2014/0153437 A1 * 6/2014 Tracy ..................... H04L 45/16
  370/254
2014/0169169 A1 * 6/2014 Almog ................ H04L 47/2441
  370/235

* cited by examiner

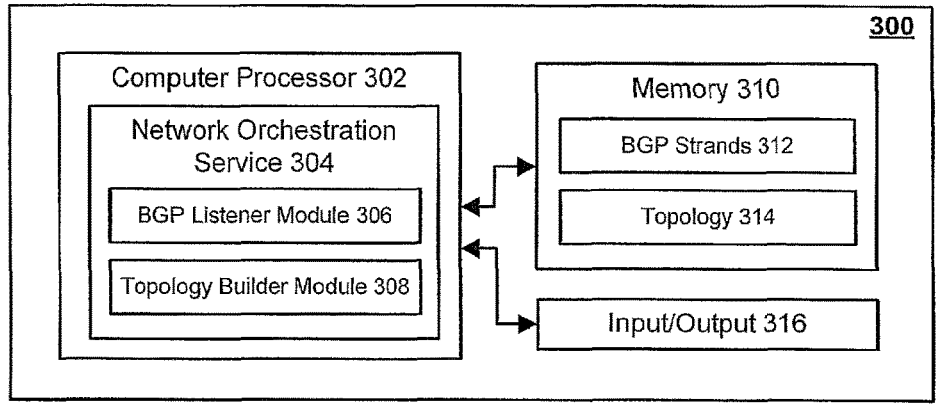
FIG. 3A
| 320 | BGP Path Information Strands | |
|---|---|---|
| | Strand 1 | I1.64512, I2.64514, I3.64518 |
| | Strand 2 | I1.64512, I5,64516, I2.64514 |
| | Strand 3 | I2.64514, I3.64518, I4.64520 |
FIG. 3B
330
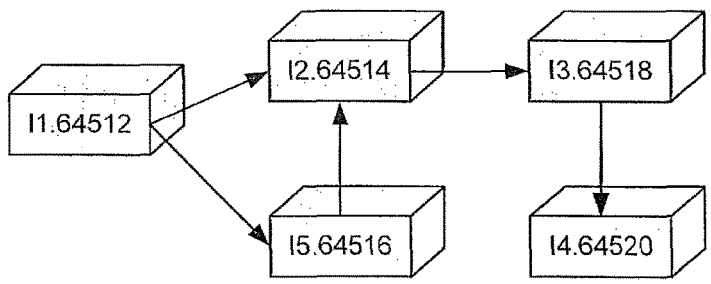
FIG. 3C

SYSTEMS AND METHODS FOR TOPOLOGY DISCOVERY AND APPLICATION IN A BORDER GATEWAY PROTOCOL BASED DATA CENTER The present application claims priority to and is a divisional of U.S. patent application Ser. No. 13/723,151 filed Dec. 20, 2012, now U.S. Pat. No. 9,225,624, the disclosure of which is incorporated herein by reference.

BACKGROUND

Technical Field

The present disclosure is related to information handling systems. In particular, embodiments disclosed herein are related to data center implementation and management.

Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is increasing demand and use of data centers to provide businesses and consumers with access to vast amounts of data and services. Some data centers include large numbers of servers networked together by a layer of top-of-rack switches, which in turn are coupled to a layer of leaf switches, which are further coupled to a layer of spine switches. Some of these devices have been configured together in data centers using the Border Gateway Protocol (BGP). However, such implementations have not been entirely satisfactory.

SUMMARY

Consistent with some embodiments, there is provided an information handling system. The information handling system includes a network orchestration service running on a computer processor. The network orchestration service provides a Border Gateway Protocol (BGP) listener module and a topology builder module. The BGP listener module is configured to receive information from a plurality of spine devices configured as an autonomous system, and the topology builder module is configured to use the information received by the BGP listener module to create a topology of a data center that includes the plurality of spine devices. Additionally, the network orchestration service is in communication with a memory, which is used to store information received by the BGP listener module and the topology of the data center.

Consistent with some embodiments, there is provided an information handling system. The information handling system includes a network orchestration service running on a computer processor. The included network orchestration service provides a Border Gateway Protocol (BGP) listener module and a topology builder module. The information handling system also includes a plurality of spine devices configured as an autonomous system and a plurality of leaf devices coupled to the plurality of spine devices and to a plurality of switches. The BGP listener module is able to listen to BGP information received by the plurality of spine devices. The plurality of switches is also coupled to a plurality of servers.

Consistent with some embodiments, there is further provided a method for providing topology discovery and associated services for a plurality of networked devices running a Border Gateway Protocol (BGP) in a data center. The method includes steps of detecting a plurality of BGP update packets being exchanged by a plurality of networked devices configured as a plurality of autonomous systems within a data center and extracting certain information from the plurality of BGP update packets. The method further includes a step of using the extracted information to create a topology of the plurality of networked devices in the data center.

These and other embodiments will be described in further detail below with respect to the following figures.

BRIEF DESCRIPTION OF THE DRAWINGS

FIG. 3A is a diagram of an information handling system that provides network orchestration services for a data center.

FIG. 3B is a table of Border Gateway Protocol path information strands.

FIG. 3C is a diagram of a data center topology created using the information in the table of FIG. 3B.

Figure 1:
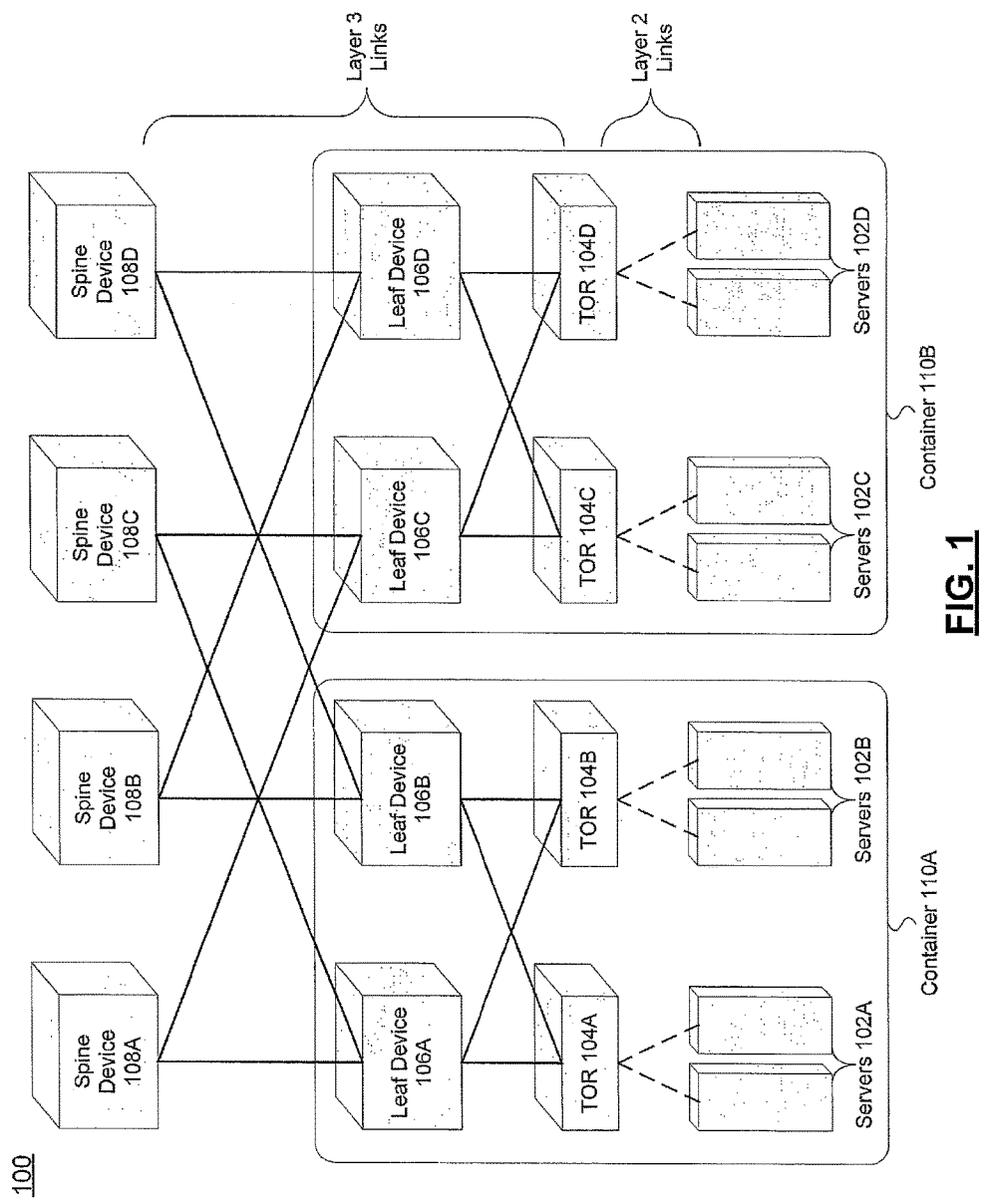
FIG. 1 is a diagram of an information handling system in which spine, leaf, and top-of-rack switches are coupled by Layer-3 links.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include nontransient, tangible machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 1 depicts an information handling system 100 that includes a plurality of spine devices coupled to a plurality of leaf devices that, in turn, are coupled to a plurality of top-of-rack (TOR) switches. In turn, the TORs are coupled to one or more servers. In the depicted embodiment, information handling system 100 is a data center.

Within the data center, data may be processed by and stored within the plurality of servers, including servers 102A, 102B, 102C, and 102D. As depicted, servers 102A is a pair of servers coupled to TOR 104A. For requests originating inside or outside of the data center to reach servers 102A-D, the request must travel through one of TORs 104A, 104B, 104C, and 104D. As depicted in FIG. 1, the links between servers 102A-D and TORs 104A-D are Layer-2 (L2) links, depicted in FIG. 1 as dashed lines.

Each of TORs 104A-D is coupled to two of leaf devices 106A, 106B, 106C, and 106D. Thus, as depicted, TOR 104A is coupled to leaf devices 106A and 106B. The other TORs are similarly coupled to the leaf devices 106A-D, which form an aggregation layer in information handling system 100. In turn, each of the leaf devices 106A-D is coupled to two of spine devices 108A, 108B, 108C, and 108D. Spine devices 108A-D may be understood as spine routers or spine switches and make up the core of the network. In the depicted embodiment, there are as many spine devices as there are leaf devices, but in other embodiments, the number of spine devices or leaf devices may be less. In such embodiments, the speed at which the spine devices operate may be higher. Also as depicted, the links between TORs 104A-D and leaf devices 106A-D and also the links between leaf devices 106A-D and spine devices 108A-D are Layer-3 (L3) links, depicted in FIG. 1 as solid lines. Consistent with some embodiments, information handling system 100 may run an L3 Interior Gateway Protocol on the links between spine devices 108A, leaf devices 106A-D and TORs 104A-D.

Information handling system 100 is configured in a three-stage Clos topology, even though as depicted, only half of the full topology is shown in FIG. 1 and subsequent figures. Information handling system 100 may be configured such that there is adequate bandwidth for communications running in at East-West direction, i.e. communications between the TORs 104A and 104B on the right and TORs 104C and 104D on the left. This bandwidth is provided between the spine devices 108A-D and leaf devices 106A-D. Additionally, in the depicted embodiment, some portions of information handling system 100 are provided in modular containers. Thus, leaf devices 106A and 106B, TORs 104A and 104B and the pairs of servers 102A and 102B are provided in a container 110A. While container 110B holds leaf devices 106C and 106D, TORs 104C and 104D, and pairs of servers 102C and 102D. In embodiments in which these components are included in containers 110A and 110B, containers 110A and 110B are configured to connect the spine devices 108A-D that are not inside containers 110A or 110B.

In other embodiments of information handling system 100, there may be more or fewer servers, TORs, leaf devices and/or spine devices. For example, an embodiment of information handling system 100 may include 10,000 servers coupled to appropriate numbers of TORs and leaf and spine devices. The Clos topology may allow relatively simple scaling of information handling system 100 and may provide natural load-balancing. Information handling system 100 may have a collapsed spine in some embodiments. In such embodiments, the number of spine devices may be half that of the number of leaf devices.

In operation, a request may come from a data center user to access data or an application residing on one of the servers, such as servers 102A. The request may be received from a public network, such as the Internet, and routed from spine device 108D to leaf device 106B, and then routed from leaf device 106B to TOR 104A. From TOR 104A the request may be switched to the appropriate one of servers 102A. In some instance, in response to the request, the one of servers 102A may send a request to one of servers 102D, physically located in container 110B. In such an instance the request is switched and then routed to the spine, and then down through either leaf device 106C or 106D to TOR 104D. The one of servers 102D may send a reply. For example, an application being used by a user on one of servers 102A may need data stored on one of servers 102D. As another example, servers may contain data for a query coming in from the Internet that needs to be collated, sequenced, and sent back to the user over the Internet.

Figure 2:
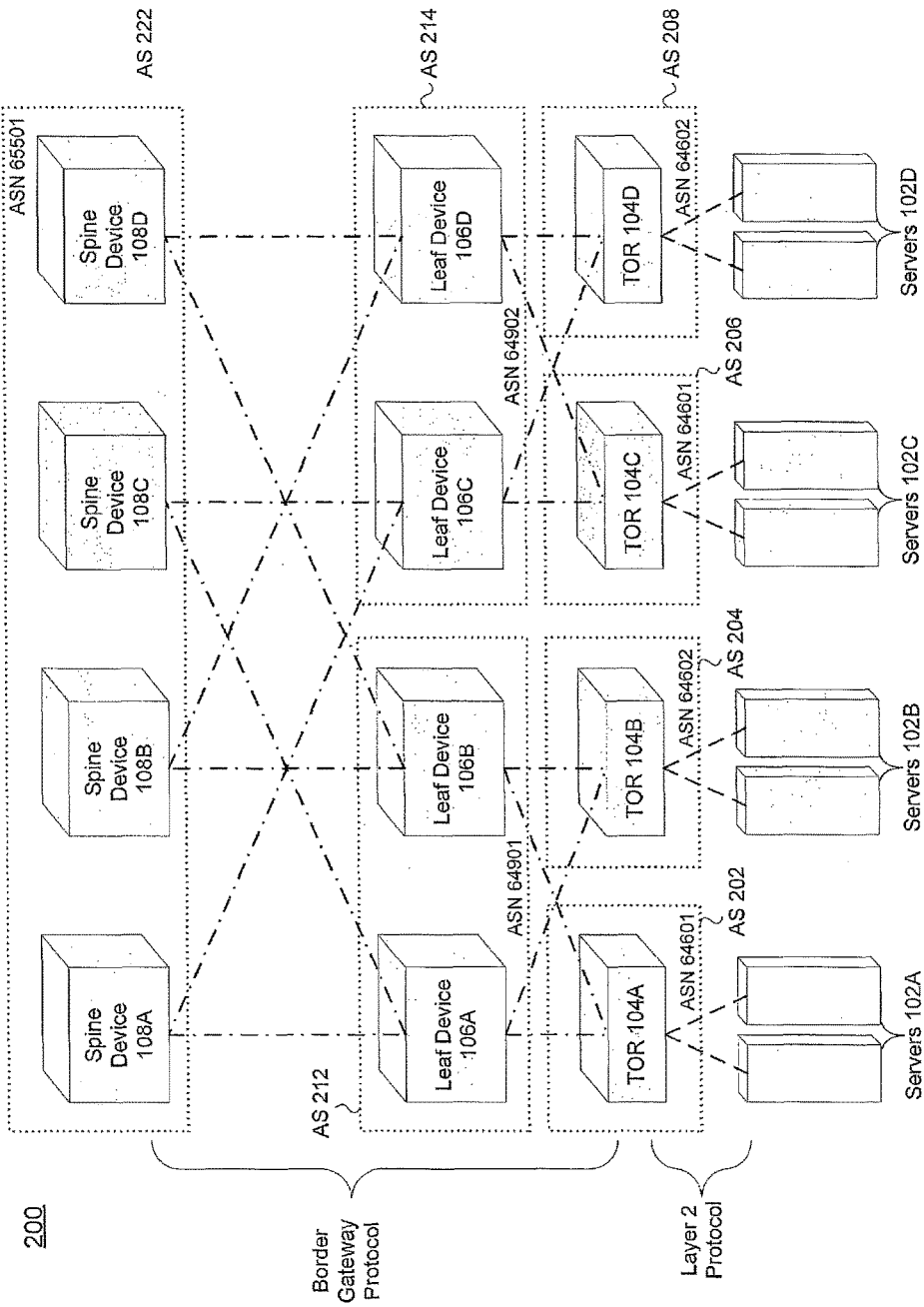
FIG. 2 is a diagram of an information handling system in which spine, leaf, and top-of-rack switches are coupled using the Border Gateway Protocol.

FIG. 2 depicts similar physical devices configured in information handling system 200. Rather than running an L3 Interior Gateway Protocol on the links between spine devices 108A-D, leaf devices 106A-D, and TORs 104A-D, information handling system 200 is configured to run the external Border Gateway Protocol (BGP) for routing on those links. This may be accomplished by treating certain components of information handling system as autonomous systems (AS's) and organizing the exchange of data between them with external BGP. In information handling system 200, each individual TOR is treated as an individual autonomous system. Thus, Tor 104A is regarded as AS 202; TOR 104A is treated as AS 204; TOR 104C as AS 206; and TOR 104D as AS 208. Similarly leaf devices 106A and 106B are in an AS 212, while leaf devices 106C and 106D are in an AS 214. Finally, all the spine devices 108A-D are configured in a single AS 222. In information handling system 200, a Layer 2 switching protocol is still used between the TORs and the servers. While not depicted, the components of information handling system 200 may be configured in one or more modular containers as seen in information handling system 100 of FIG. 1.

In other embodiments of information handling system 200, the autonomous systems may be configured differently than depicted. For example, Layer 2 switching may be used between the TORs 104A-D and the leaf devices 106A, such that TORs 104A-D are not treated as AS's. Or in another example, TORs 104A and 104B may be configured as a single AS.

In information handling system 200, an autonomous system is a group of network devices, such as routers, running a common Internal Gateway Protocol (IGP) and operating under a single administrative entity. Each AS information handling system 200 receives an identifying AS number, or ASN. The AS numbers used within information handling system 200 may be two bytes ASNs, however in some embodiments, ASNs may be four byte numbers. When using two byte ASNs, the potential numbers range from 0 to 65536. Most of these numbers are assigned by the Internet Assigned Numbers Authority (IANA). However, IANA has designated a range of two byte ASNs as private ASNs, the range included 64512 to 65534. IANA does not need to assign these numbers to enable their use.

In information handling system 200, the spine devices 108A-D are configured to use a private ASN. As depicted, AS 222 uses 65501 as its ASN. However, in some embodiments, public ASNs may be used in conjunction with filtering at the domain boundaries of information handling system 200. Also in the depicted embodiment, AS 212 uses 64901 as its ASN, AS 214 uses 64902 as its ASN, both TOR 104A and 104C use 64601 as their ASN, and both TOR 104B and 104D use 64602 as their ASN. Thus, at least at the TOR level, ASNs are reusable. This may be provided by using the "Allow-AS-In" command to reuse the numbers so that the usual loop detection mechanism in external BGP is disabled.

Reusing ASNs within information handling system 200 could potentially cause problems as directing packets is complicated by the potential ambiguity of the duplicate use of a single ASN. However, when the AS's in information handling system 200 exchange BGP packets, the BGP packets include prefixes and attributes. One such attribute is AS-PATH-INFO. AS-PATH-INFO typically includes ASN numbers. When AS 202 (ASN 64601) sends an update to AS 212 (ASN 64901), the BGP update packet indicates the packet came from ASN 64601. A BGP packet can indicate that IP addresses 1.1.1.0/24 are available through AS 202 (TOR 104A). AS 202 adds its ASN to the update packet's prefix, as does AS 212 before it sends the update packet to AS 222 (ASN 65501). Using the information added to the update packet's prefix, each receiving network component can calculate the shortest path to the prefix.

In order to receive information about more than the shortest path, a command may be used to configure information handling system 200 so that each device in the system computes more than one path or computes all possible paths. For example, by using an "AS-Path Multipath-Relax" command, rather than computing a single path between one leaf device and another, or between a TOR and a leaf device, all possible paths may be computed.

The devices in information handling system 200 may be further configured to modify the AS-PATH-INFO to combine the ASN of the device with the BGP router ID of the device. The BGP router ID may be the loopback address of the device. By including both the ASN and the router ID of the device as an entry in the AS-PATH-INFO attribute, uniquely identifying paths through information handling system 200 can be done even though some ASNs are reused at the TOR level. For example, the BGP router ID of TOR 104A is 10.10.10.10, while the BGP router ID of TOR 104C is 11.11.11.11. Even though both use ASN 64601, when their BGP router ID's are added to their ASN, they are included in AS-PATH-INFO attributes as 10.10.10.10.64601 for TOR 104A and 11.11.11.11.64601 for TOR 104C. In this way, the two TORs are uniquely identified while sharing the same ASN.

Alternatively, other ways of carrying the router ID may be used to ensure uniqueness throughout information handling system 200. For example, a transitive non-discretionary vector in alignment with AS-PATH-INFO may provide this capability. By collecting and analyzing the AS-PATH-INFO in all the BGP update packets received at the spine level, information handling system 200 may provide a complete topology of itself to a network orchestration service coupled to information handling system 200. This may be better understood with reference to FIGS. 3A-C.

FIG. 3A is a diagram of an information handling device 300 that may be used to provide and use a topology of information handling system 300. In the depicted embodiment, information handling device 300 is a network orchestration server. Information handling device 300 (hereinafter, server 300) includes at least one computer processor 302. Computer processor 302 may be a specialized, application specific integrated circuit (ASIC) for providing the functions of a networking switch or router. Computer processor 302 provides a network orchestration service 304. On some embodiments, network orchestration service 304 is provided by Dell, Inc. of Round Rock, Tex. Network orchestration service 304 receives information from information handling system 200 in order to calculate the topology of the system and in order to monitor it for performance and failures. One embodiment of network orchestration service 304 is a set of computer-readable instructions that, when executed by computer processor 302, receive and process information from information handling system 200.

As depicted, network orchestration service 304 is an OpenFlow controller that is configured to communication with OpenFlow agents on the spine devices 108A-D, leaf devices 106A-D, and TOR 104A-D of information handling system 200. Controllers and agents other than OpenFlow controls and agents may be used in some embodiments. Additional features may be available such as IP Traffic Engineering (IP-TE) IP Fast Reroute (IP-FRR), Equal-Cost Multipathing-Path-Setup (ECMP-Path-Setup) as well as Multi-Protocol Label Switching Traffic Engineering (MPLS-TE) and MPLS-FRR.

Network orchestration service 304 has a plurality of modules, including a BGP listener module 306 and a topology builder module 308. Like network orchestration service 304, embodiments of BGP listener module 306 and topology builder module 308 may be computer-readable instructions executable by computer processor 302. In some embodiments, computer processor 302 is one or more computer processors, each having one or more processing cores. BGP listener module 306 receives copies of BGP update packets received by spine devices 108A-D of information handling system 200. BGP listener module 306 is a passive listener module that can extract information from the AS-PATH-INFO attributes, including prefixes and associated strands, examples of which will be given later. Using the strands recovered by BGP listener module 306, topology builder module 308 uses relationships between the strands to form a topology of information handling system 200. The topology includes representations of each of the devices within information handling system 200, includes the spine devices, leaf devices, TORs, and servers. As devices are added or subtracted, the topology can be updated by the continually transmitted BGP updates.

Server 300 also includes memory 310 that can be used to store BGP strands 312 that are received and a topology 314 of information handling system 200. Additionally, server 300 includes an input/output 316, which may be a network interface card or other suitable mechanism for handling communication between server 300 and spine devices 108A-D. In some embodiments, BGP listener module 306 and topology builder module 308 may be provided as computer readable instructions stored in memory 310, that when executed cause the performance of both modules as detailed above. In other embodiments, BGP listener module 306 and topology builder module 308 are each ASICs or discrete modules.

FIG. 3B includes an exemplary BGP Path Information Strands table 320, such as may be stored as BGP strands 312 in memory 310. Each of the three strands depicted includes three graph nodes. Each graph node is a unique identifier of a device in the data center and includes two parts: the first part is the BGP router ID of the device, and the second part is the ASN of the device. In the exemplary table 320, the BGP router ID's are represented as "I" with a number, while each of the ASNs is represented by a three digit number. This is done for clarity of presentation. The combination of the router ID and ASN allows for each graph node to represent a single device, even though ASNs may be used more than once within a particular information handling system. Thus strand 1, includes three graph nodes, I1.64512, I2.64514, and I3.64518, strand 2 includes I1.64512, I5.64516, and I2.64514, while strand 3 includes I2.64514, I3.64518, and I4.64520.

By computing these strands, topology builder 308 can create an exemplary topology 330, as seen in FIG. 3C, of the network described by exemplary table 320. By recognizing that each graph node in a strand is coupled to its neighbors, linked relationships between the graph nodes can be determined. While in this example, all of the graph nodes have a unique ASN, in other examples in which an ASN is used twice (like in information handling system 200), the combination of the router ID and the ASN remains unique in the overall system. In information handling system 200, many strands may include three graph nodes, one from each of the TOR, leaf, and spine layers. However, some strands may reflect interconnections between devices on a same layer. For example, an interconnect link may be present in information handling system 200 between leaf devices 106A and 106B. Depending on how leaf devices 106A and 106B are coupled, strands depicting paths through the interconnect links may include more than three graph nodes. However, this does not pose a problem for topology builder module 306.

Using server 300 and BGP listener module 306 and topology builder module 308 as described above, a topology 314 of information handling system 200 can be created using the BGP update packets as modified as discussed herein. The topology 314 can be stored in memory 310, or can be exported through input/output 316. In some embodiments, in addition to receiving network data and information through input/output 316, video data may be sent out as well. For example, computer processor 302 may cause a visual representation of topology 314 to be sent through input/output 316 to a display so that an operator of information handling system 200 may visualize the topology and activity of the system. A number of applications may be facilitated by discovering the topology of information handling system 200 as described and by providing corresponding visual representations.

FIGS. 4-8 depict applications using the created topology that may improve the operation and management of data centers. In general these applications can provide a wide variety of protection, quality-of-service (QoS), and multicast schemes. The protection schemes may include link protection schemes provided by customized next hop (NHOP) tunnels. The customized NHOP may be stored by the OpenFlow agent operating on the particular networking device or configured in hardware as IP fast rerouting (IP-FRR). Alternatively a hybrid scheme may be deployed that uses bidirectional forwarding detection (BFD) as a first line, but a BFD failure triggers the OpenFlow agent to install the IP-FRR path. Customized next next hop (NNHOP) may be used for node protection.

Figure 4:
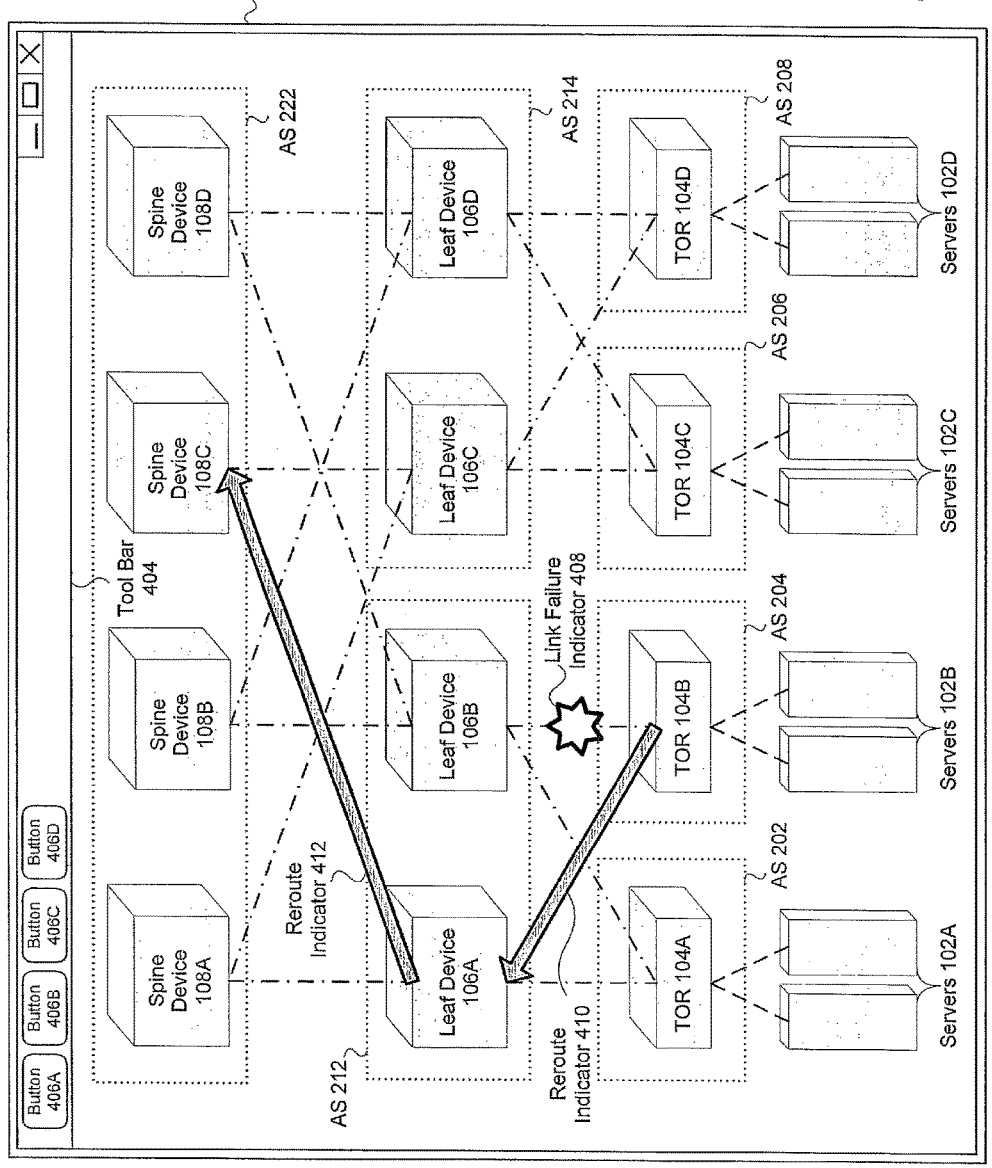
FIG. 4 is a diagram of a graphic user interface window that assists an operator in controlling a data center in response to a link failure between a top-of-rack and leaf devices.

FIG. 4 is a diagram of a graphic user interface (GUI) window that assists an operator in controlling a data center in response to a link failure between a top-of-rack and a leaf device. The GUI may be provided by server 300 of FIG. 3A is connection with a display. GUI window 402 represents what is displayed to the operator of information handling system 200 of FIG. 2. By using BGP listener module 306 and topology builder module 308 the topology of information handling system 200 can be determined and displayed in GUI window 402. GUI window 402 also includes a tool bar 404 that has a plurality of buttons or icons 406A-D. Tool bar 404 includes a plurality of tools that can be used in visualizing and operating information handling system 200. Some examples of tools an operator can access by the buttons 406A-D in tool bar 404 will be discussed herein. Server 300 is configured to determine from BGP update packets communicated on spine devices 108A-D that a link failure has been detected between leaf device 106B and TOR 104B. Server 300 overlays a link failure indicator 408 on the topology to communicate the problem to the operator in GUI window 402.

In response to the link failure communicated to the operator by link failure indicator 408, the operator may use a tool (accessed by one of buttons 406A-D) to reroute the traffic around the failed link. By using a mouse or other input device, such as a keyboard or touch screen, the operator may place a reroute indicator 410 between TOR 104B and leaf device 106A. By using the reroute tool, the operator may cause a visual representation of the new route to appear on the screen (as reroute indicator 410), but this tool may cause corresponding commands to be issued from the network orchestration service 304 running on computer processor 302 to be sent to the spine devices 108A-D and deeper into the data center from there. These commands may alter the routing paths contained in TOR 104B in such a way that it redirects traffic away from leaf device 106B to its rightmost connection to leaf device 106A. The operator may further use a reroute tool to indicate (by reroute indicator 412) that the traffic sent from TOR 104B is to be sent over the link from leaf device 106A to spine device 108C rather than to spine device 108A.

Alternatively, during a training mode provided by network orchestration service 304, link failure indicator 408 may be displayed to prompt the operator to pre-program an alternative path to be implemented automatically by the network orchestration services in the event of a failure as displayed. Thus network orchestration service 304 may use GUI window 402 to request and receive pre-programming for a link failure between 104B and 106B.

Figure 5:
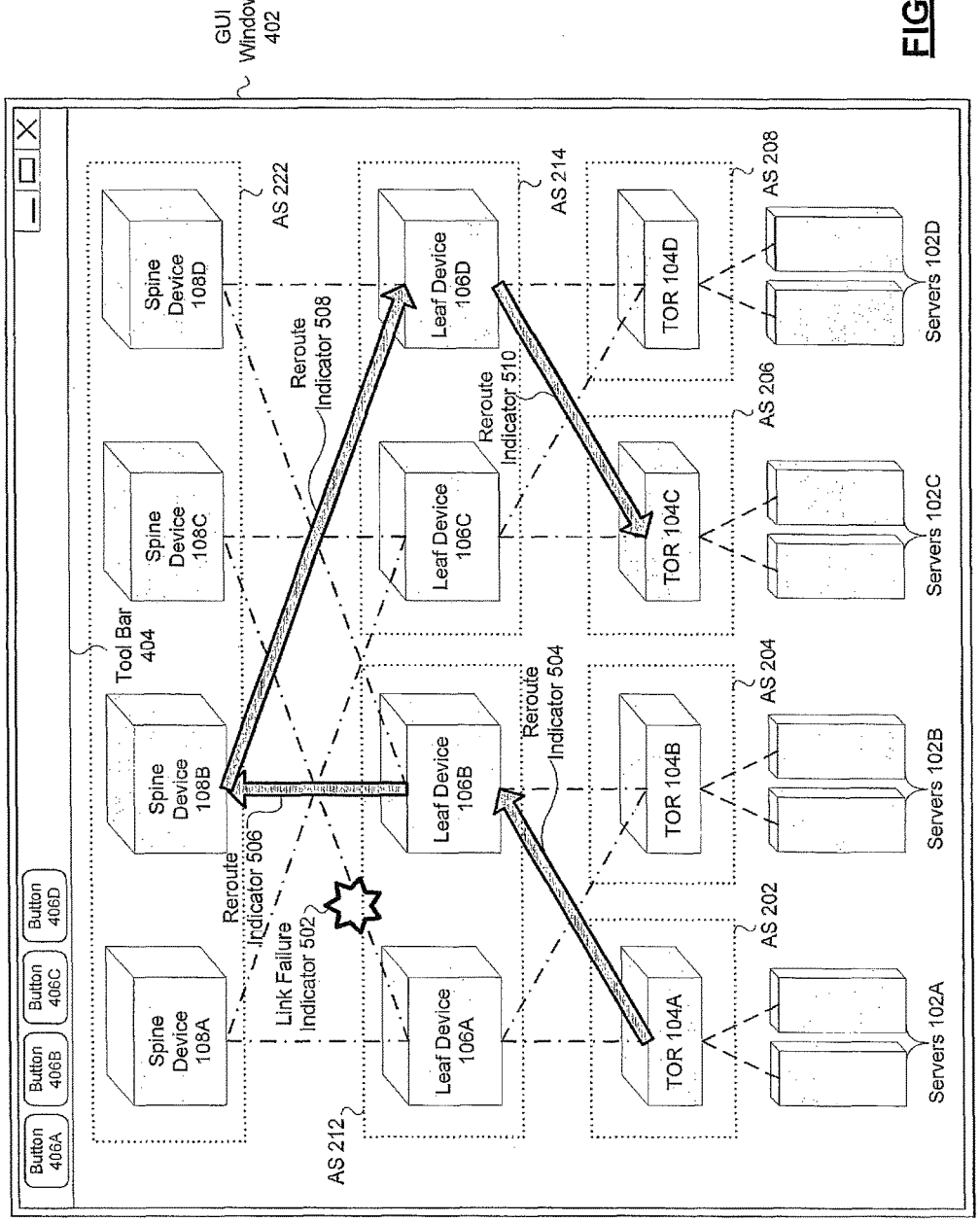
FIG. 5 is a diagram of a graphic user interface window that assists an operator in controlling a data center in response to a link failure between leaf and spine devices.

FIG. 5 is a diagram of a GUI window 402 that assists an operator in controlling a data center in response to a link failure between leaf and spine devices. In response to a link failure detected between leaf device 106A and spine device 108C, network orchestration service 304 causes a link failure indicator 502 to be displayed on the visual representation of the link between those two devices. When the link failure is detected, an operator may be prompted to select an alternate path to use instead of a path used prior to the failure (not depicted). Using the reroute tool accessed by selecting one of buttons 406A-D from tool bar 404, the operator may draw on the display a representation of the desired alternate path. The alternate path for transmitting from TOR 104A to TOR 104C is depicted by reroute indicators 504, 506, 508, and 510. Alternatively, the alternate path may be pre-programmed by the operator so that when a failure occurs where link failure indicator 502 indicates, the pre-selected alternate path is automatically implemented in information handling system 200.

Figure 6:
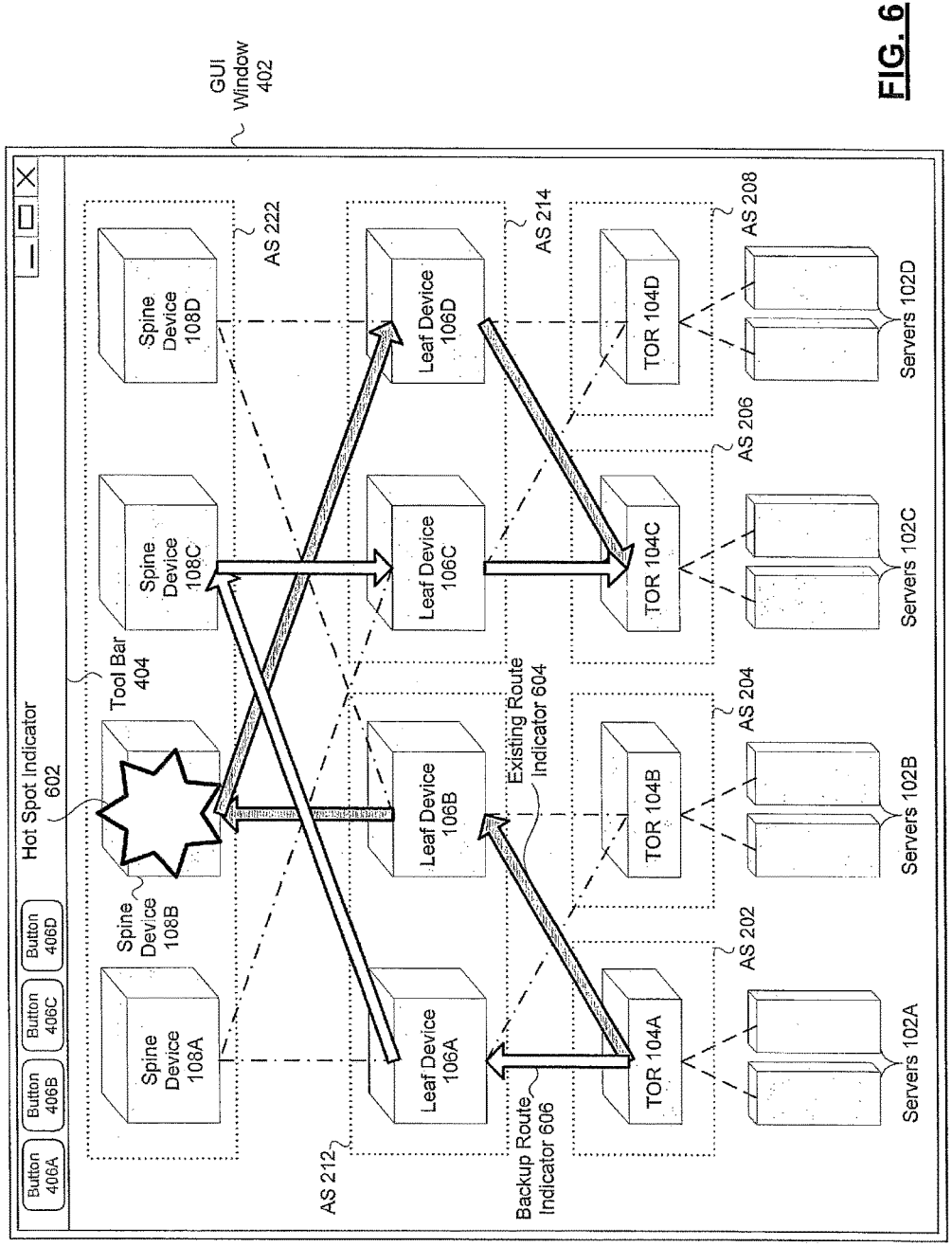
FIG. 6 is a diagram of a graphic user interface window that assists an operator in controlling a data center in response to a hot spot in the data center.

FIG. 6 is a diagram of a GUI window 402 that assists an operator in controlling a data center in response to a hot spot in the data center. By analyzing past or current usage data, an operator of information handling system 200 may be aware that the demands placed by the network on spine device 108B (covered by hot spot indicator 602) can exceed its capacity at certain times. Additionally, in some embodiments, network orchestration service may be able to detect that the usage of spine device 108B has surpassed a threshold. In this example, the threshold is a pre-set threshold, a threshold that was set by the operator at an earlier time. In other embodiments, a general threshold may be applied to all devices in information handling system 200. When the threshold is exceeded, network orchestration service 304 displays a hot spot indicator 602 over the hot spot in GUI window 402 to communicate the event to the operator.

Also depicted in GUI 402 is an existing route indicator 604, which includes arrows between TOR 104A and leaf device 106B, leaf device 106B and spine device 108B, spine device 108B and leaf device 106D, and leaf device 106D and TOR 104C. This represents a path being used by information handling system 200 that is causing the usage of spine device 108B to exceed the threshold. Using tools accessed in tool bar 404, the operator configures a backup route, displayed in FIG. 6 as the white arrows of backup route indicator 606. As depicted, the backup route corresponding to backup route indicator 606 avoids the hot spot depicted by the hot spot indicator 602. The backup route is implemented in information handling system 200 by network orchestration service 304. The reroute may be pre-programmed by the operator when setting the threshold for usage of spine device 108B. In the depicted embodiment, when the usage of spine device 108B goes below a low threshold, the use of the backup route may be ended and the use of the existing route resumes.

Figure 7:
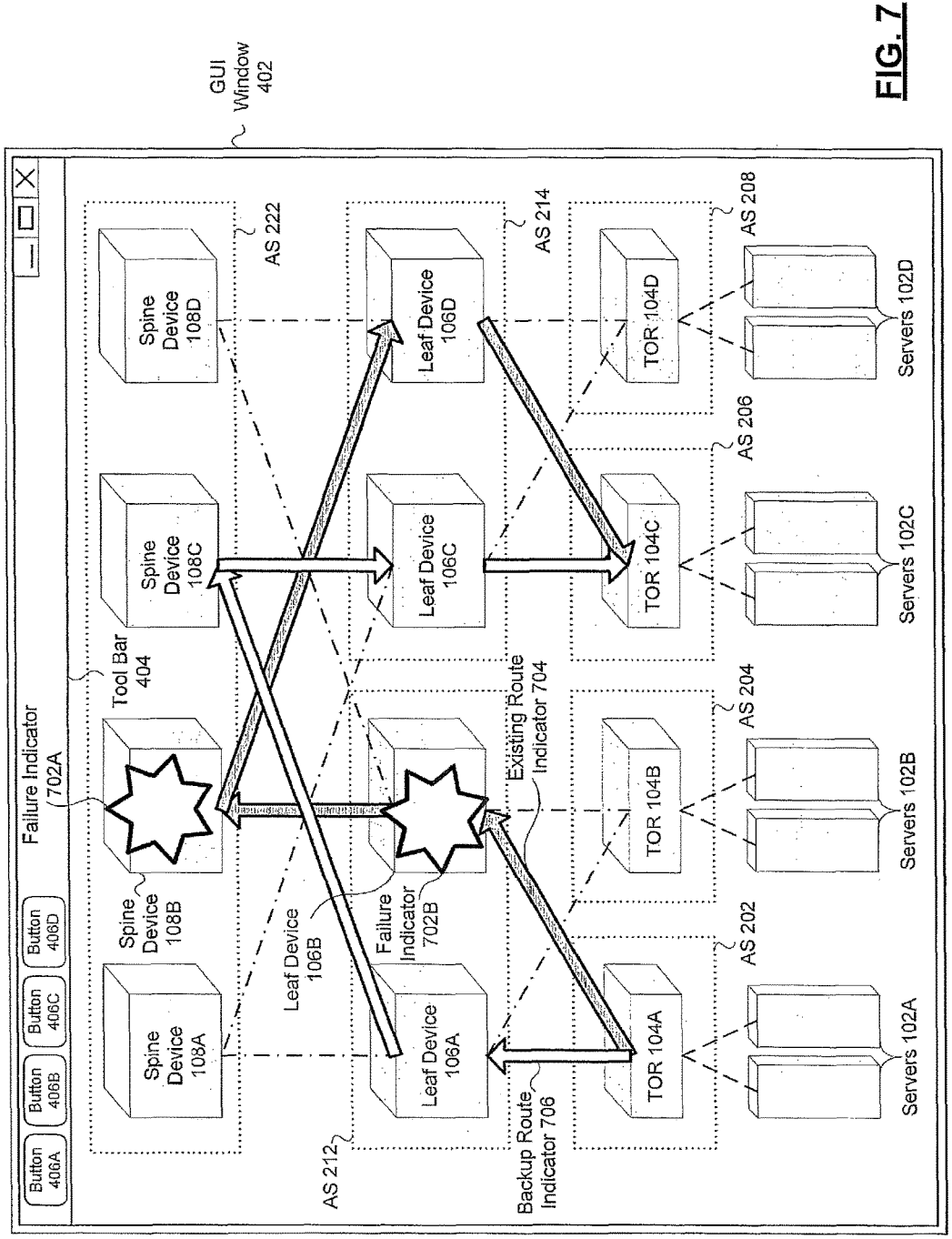
FIG. 7 is a diagram of a graphic user interface window that assists an operator in controlling a data center in response to two hot spots along a path in the data center.

FIG. 7 is a diagram of a graphic user interface window that assists a user in controlling a data center in response to multiple hot spots in the data center. Due to overloads communicated by failure indicators 702A and 702B, the network orchestration service 304 computes a link and node disjoint path for specific subnet traffic or all traffic from TOR 104A. Network orchestration service 304 may cause TOR 104A to switch from the path illustrated by existing route indicator 704 to the path illustrated as backup route indicator 706.

Figure 8:
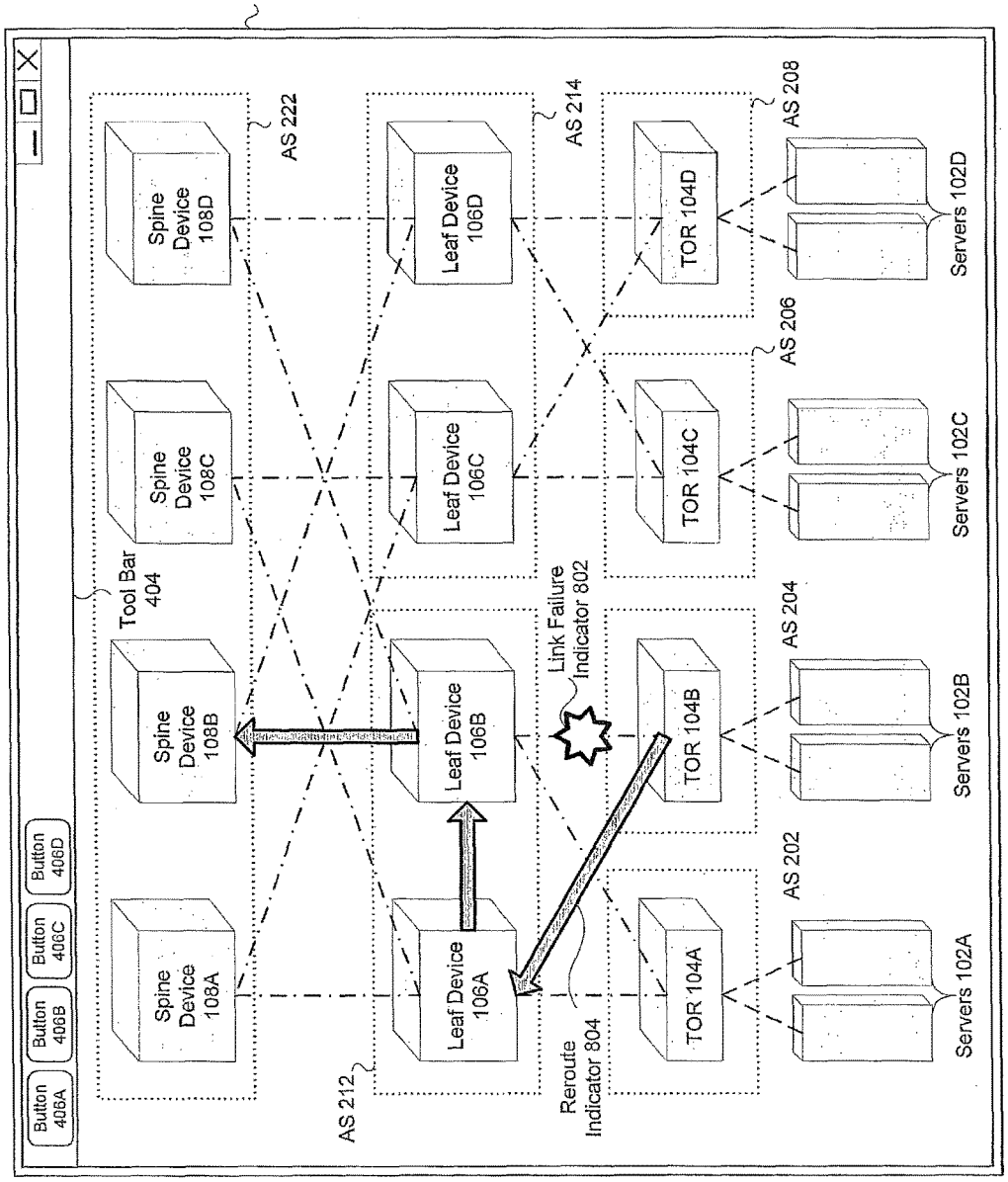
FIG. 8 is a diagram of a graphic user interface window that assists an operator in controlling a data center in response to a link failure in the data center.

FIG. 8 is a diagram of a graphic user interface window that assists a user in controlling a data center in response to a link failure in the data center by utilizing an interconnect link between leaf devices 106A and 106B. In the depicted embodiment a virtual line or link trunk is in active-active mode communicating over the interconnect link between the pair of leaf devices. Network orchestration service 304 causes a link failure indicator 802 to be displayed when it detects a link failure at the corresponding location in information handling system 200. Rather than attempt to route traffic around leaf device 106B entirely, a backup path following the arrows of reroute indicator 804 may be implemented. This path utilizing the interconnect link between leaf device 106A and 106B so that the original path's hop from leaf device 106B to spine device 108B continues to be used.

Figure 9:
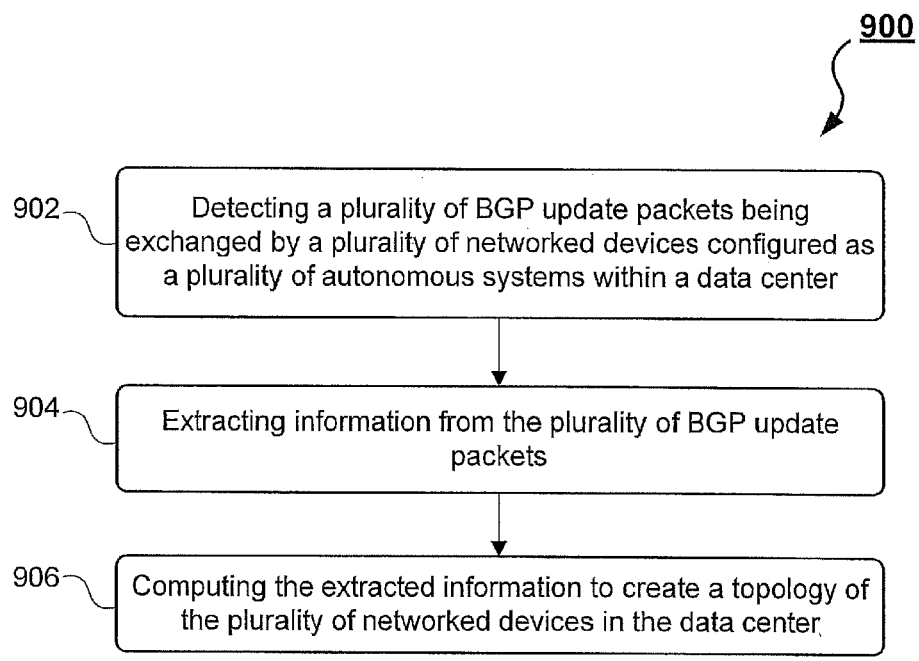
FIG. 9 is a flowchart of a method for providing topology discovery and associated services in a plurality of networked devices running a Border Gateway Protocol in a data center.

FIG. 9 is a flowchart of a method 900 for providing topology discovery and associated services in a plurality of networked devices running a Border Gateway Protocol in a data center. Method 900 begins in step 902 steps of detecting a plurality of BGP update packets being exchanged by a plurality of networked devices configured as a plurality of autonomous systems within a data center, such as can be seen in information handling system 200 of FIG. 2.

In step 904, information is extracted from the plurality of BGP update packets. And in step 906, the extracted information may be used to create a topology of the plurality of networked devices in the data center.

Method 900 may be performed by information handling device 300 of FIG. 3A coupled to the spine devices 108A-D of information handling system 200 of FIG. 2. For example, network orchestration service 304 running on server 300, is in communication with spine devices 108A-D and uses BGP listener module 306 to listen the BGP update packets being exchanged on the spine devices (step 902). The BGP update packets include strands like those seen in FIG. 3B, each containing a plurality of graph nodes. BGP listener module 304 extracts the strands from the AS-PATH-INFO attributes in each of the BGP update packets (step 904). The plurality of devices are configured in a number of AS's within information handling system 200, and the graph nodes are formed by including the router ID of the receiving device along with the device's ASN according the how the AS's are configured. By using the relationships between the graph nodes as indicated by their relationships within the strands, topology builder module 308 creates a topology of the networked devices in information handling system 200, even though some of the AS's in the TOR level may use an ASN more than once.

In additional embodiments of method 900, server 300 may display a representation of the calculated topology to a monitor connected by input/output 316. This display may allow an operator of the data center to set thresholds for a node in the topology. Network orchestration service 304 may monitor traffic across information handling system 200 in order to detect traffic handling problems, such as link and node failures, and where the usage of a component is exceed what the operator deems to be a safe operating level. The network orchestration service 304 may also display the traffic handling problems on the visual representation of the topology in the corresponding location. The operator may use a plurality of tools in order to direct traffic around the site of the traffic handling problems, which may be done by programming or pre-programming an alternate data path.

Some embodiments of information handling systems 200 and server 300 include nontransient, tangible, machine-readable media that include executable code that when run by a processor, such as computer processor 302 of server 300 in FIG. 3A, may cause the processor to perform the steps of method 900 as described above. Some common forms of machine-readable media that may include the steps of method 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 310 of FIG. 3A.

The examples provided above are exemplary only and are not intended to be limiting. One skilled in the art may readily devise other systems consistent with the disclosed embodiments which are intended to be within the scope of this disclosure. As such, the application is limited only by the following claims.

We claim:

1. An information handling system comprising:
   a network controller comprising a memory and a processor coupled to the memory, the processor being configured to implement a network orchestration service; and
   a network, the network comprising:
      a plurality of spine devices configured as an autonomous system; and
   a plurality of leaf devices coupled to the plurality of spine devices and to a plurality of switches; wherein the network orchestration service is configured to:
      detect, using a BGP listener module, a plurality of border gateway protocol (BGP) packets exchanged by the spine devices;
      extract, using a topology builder module, topology information from the detected BGP update packets;
      determine, using the topology builder module, a topology of the network based on the extracted topology information;
      detect one or more of a link failure in the network, a hot spot in the network, or a node failure in the network; and
      send, in response to the detecting of one or more of the link failure, the hot spot, or the node failure, one or more configuration commands to one or more of the spine devices, the leaf devices, or the switches to alter one or more communication paths through the network based on the determined topology.

2. The information handling system of claim 1, wherein half of the plurality of leaf devices is distributed in a first leaf autonomous system and the other half of the plurality of leaf devices is distributed in a second leaf autonomous system and each of the plurality of switches is a separate autonomous system, and each autonomous system is assigned an autonomous system number.

3. The information handling system of claim 2, wherein at least some of the autonomous system numbers are public autonomous system numbers.

4. The information handling system of claim 2, wherein two of the separate autonomous systems are assigned an identical private autonomous system number.

5. The information handling system of claim 1, wherein the BGP update packets include a plurality of path information strands, each path information strand including a path through the network, the path being represented by a sequence of graph nodes, each graph node including a BGP router identifier and an autonomous system number.

6. The information handling system of claim 1, wherein the network orchestration service is further configured to provide a graphical user interface (GUI), the GUI configured to:
   present a visual representation of the topology to a user;
   depict a type and a location of the link or node failure;
   receive commands from the user to configure network traffic through the plurality of switches, the plurality of leaf devices, and the plurality of spine devices to mitigate the link or node failure; and
   send the one or more configuration commands based further on the commands received from the user.

7. The information handling system of claim 6, wherein the GUI is further configured to allow the user to:
   input a plurality of backup routes through the topology; and
   designate a usage threshold for a device in the topology such that when a level of usage of the device exceeds the designated usage threshold, one of the plurality of backup routes is employed by the network orchestration service to route traffic away from the device.

8. The information handling system of claim 6, wherein the failure is a failure of a link between one of the plurality of switches and one of the plurality of leaf devices.

9. The information handling system of claim 1, wherein the plurality of spine devices, the plurality of leaf devices, the plurality of switches, and a plurality of servers are configured in a Clos topology.

10. A network controller comprising:
    a memory; and
    a processor coupled to the memory;
    wherein the processor is configured to:
       detect a plurality of border gateway protocol (BGP) packets exchanged by a plurality of spine devices in a network, the network further comprising a plurality of leaf devices coupled to the plurality of spine devices and to a plurality of switches;
       extract topology information from the detected BGP update packets;
       determine a topology of the network based on the extracted topology information;
       detect one or more of a link failure in the network, a hot spot in the network, or a node failure in the network; and
       send, in response to the detecting of one or more of the link failure, the hot spot, or the node failure, one or more configuration commands to one or more of the spine devices, the leaf devices, or the switches to alter one or more communication paths through the network based on the determined topology.

11. The network controller of claim 10, wherein the BGP update packets include a plurality of path information strands, each path information strand including a path through the network, the path being represented by a sequence of graph nodes, each graph node including a BGP router identifier and an autonomous system number.

12. The network controller of claim 11, wherein at least some of the autonomous system numbers are public autonomous system numbers.

13. The network controller of claim 11, wherein two of the autonomous system numbers are identical.

14. The network controller of claim 10, wherein the network controller is further configured to provide a graphical user interface (GUI), the GUI configured to:
- present a visual representation of the topology to a user;
- depict a type and a location of the link or node failure;
- receive commands from the user to configure network traffic through the plurality of switches, the plurality of leaf devices, and the plurality of spine devices to mitigate the link or node failure; and
- send the one or more configuration commands based further on the commands received from the user.

15. The network controller of claim 14, wherein the GUI is further configured to allow the user to:
- input a plurality of backup routes through the topology; and
- designate a usage threshold for a device in the topology such that when a level of usage of the device exceeds the designated usage threshold, one of the plurality of backup routes is employed by the network controller to route traffic away from the device.

16. The network controller of claim 15, wherein the failure is a failure of a link between one of the plurality of switches and one of the plurality of leaf devices.

17. A method comprising:
- detecting, by a network controller comprising a memory and a processor coupled to the memory, a plurality of border gateway protocol (BGP) packets exchanged by a plurality of spine devices in a network, the network further comprising a plurality of leaf devices coupled to the plurality of spine devices and to a plurality of switches;
- extracting topology information from the detected BGP update packets;
- determining a topology of the network based on the extracted topology information;
- detecting one or more of a link failure in the network, a hot spot in the network, or a node failure in the network; and
- sending, in response to the detecting of one or more of the link failure, the hot spot, or the node failure, one or more configuration commands to one or more of the spine devices, the leaf devices, or the switches to alter one or more communication paths through the network based on the determined topology.

18. The method of claim 17, wherein the BGP update packets include a plurality of path information strands, each path information strand including a path through the network, the path being represented by a sequence of graph nodes, each graph node including a BGP router identifier and an autonomous system number.

19. The method of claim 17, further comprising providing a graphical user interface (GUI), the GUI configured to:
- present a visual representation of the topology to a user;
- depict a type and a location of the link or node failure;
- receive commands from the user to configure network traffic through the plurality of switches, the plurality of leaf devices, and the plurality of spine devices to mitigate the link or node failure; and
- send the one or more configuration commands based further on the commands received from the user.

20. The method of claim 19, wherein the GUI is further configured to allow the user to:
- input a plurality of backup routes through the topology; and
- designate a usage threshold for a device in the topology such that when a level of usage of the device exceeds the designated usage threshold, one of the plurality of backup routes is employed by the network controller to route traffic away from the device.

* * * * *